(12) United States Patent
Roschelle et al.

(10) Patent No.: US 6,885,844 B2
(45) Date of Patent: Apr. 26, 2005

(54) SYSTEM, METHOD AND COMPUTER PROGRAM PRODUCT FOR RAPIDLY POSING RELEVANT QUESTIONS TO A GROUP LEADER IN AN EDUCATIONAL ENVIRONMENT USING NETWORKED THIN CLIENT DEVICES

(75) Inventors: Jeremy Roschelle, Palo Alto, CA (US); Christopher J. DiGiano, Boulder, CO (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/792,159

(22) Filed: Feb. 21, 2001

(65) Prior Publication Data

US 2002/0115049 A1 Aug. 22, 2002

(51) Int. Cl.[7] ................................................. G09B 3/00
(52) U.S. Cl. ....................... 434/350; 434/362; 434/323; 434/322
(58) Field of Search ................................ 434/350, 362, 434/322, 323

(56) References Cited

U.S. PATENT DOCUMENTS

| | | | | |
|---|---|---|---|---|
| 5,002,491 A | * | 3/1991 | Abrahamson et al. | .. 434/322 X |
| 5,437,555 A | * | 8/1995 | Ziv-El | ..................... 434/336 X |
| 5,671,409 A | * | 9/1997 | Fatseas et al. | ........... 707/104.1 |
| 5,823,788 A | * | 10/1998 | Lemelson et al. | ....... 434/350 X |
| 5,954,516 A | * | 9/1999 | Heinberg | ................. 434/322 X |
| 6,024,577 A | * | 2/2000 | Wadahama et al. | ..... 434/322 X |
| 6,155,840 A | * | 12/2000 | Sallette | .................... 434/323 X |
| 6,201,948 B1 | * | 3/2001 | Cook et al. | .................. 434/350 |
| 6,250,930 B1 | * | 6/2001 | Mintz | ..................... 434/323 X |
| 6,287,125 B1 | * | 9/2001 | Dorcely | .................. 434/323 X |
| 6,302,698 B1 | * | 10/2001 | Ziv-El | ..................... 434/323 X |
| 6,325,632 B1 | * | 12/2001 | Chao et al. | ............. 434/322 X |
| 6,381,444 B1 | * | 4/2002 | Aggarwal et al. | .......... 434/350 |
| 6,397,036 B1 | * | 5/2002 | Thean et al. | ............ 434/350 X |
| 6,398,556 B1 | * | 6/2002 | Ho et al. | ................ 434/219 X |
| 6,411,796 B1 | * | 6/2002 | Remschel | ............... 434/350 X |
| 2001/0049597 A1 | * | 12/2001 | Klipstein | ................. 704/200.1 |

* cited by examiner

*Primary Examiner*—Chanda L. Harris
(74) *Attorney, Agent, or Firm*—Moser, Patterson & Sheridan, LLP.

(57) ABSTRACT

A system, method and computer program product are disclosed for providing feedback using networked devices. Initially, a plurality of response types are displayed on a plurality of networked devices. Further, a plurality of presented concepts are depicted on the networked devices. As such, users of a group are permitted to select at least one of the response types and at least one of the presented concepts. Further, the selected response type and the presented concepts are transmitted to a head of the group for providing feedback regarding material being presented by the head of the group.

18 Claims, 7 Drawing Sheets

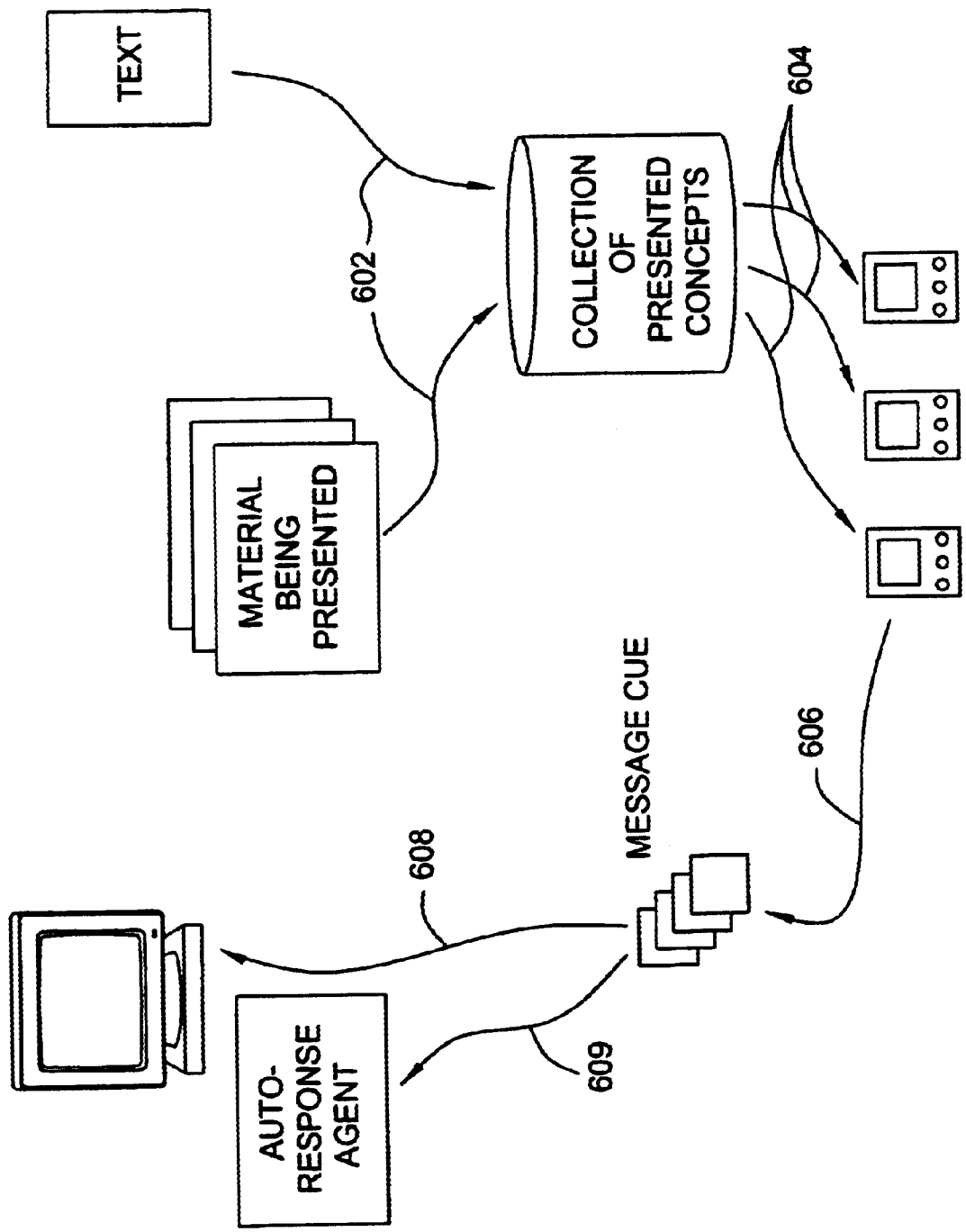

SYSTEM, METHOD AND COMPUTER PROGRAM PRODUCT FOR RAPIDLY POSING RELEVANT QUESTIONS TO A GROUP LEADER IN AN EDUCATIONAL ENVIRONMENT USING NETWORKED THIN CLIENT DEVICES

FIELD OF THE INVENTION

The present invention relates to networked devices, and more particularly to facilitating student feedback in an educational environment using networked devices.

BACKGROUND OF THE INVENTION

There have been numerous techniques devised for enabling a teacher to more easily convey information and understanding to a class, and ultimately to relieve the teacher, to the greatest extent possible, of a number of the burdens associated with conveying that information to the class. Electronically-based classroom teaching systems have been used to implement some of such techniques.

One of the important services an electronically-based classroom teaching system can provide is to enable a teacher to monitor progress of the class and of individual students, and to focus effort in areas where students seem to have the most trouble understanding the concepts being taught.

One example of such a system is described in U.S. Pat. No. 6,086,381, which discloses an interactive learning system that has an interactive control unit that displays competition or quiz questions in multiple-choice or other format. Students using the system enter answer choices on a wireless keypad. A base station connected to the interactive control unit receives answer choices from and communicates with the wireless keypads. The interactive control unit keeps track of the scores for all users, and scores of different groups of users (i.e., classes). A receiver connected to the interactive control unit receives content for competitions by satellite broadcast. The competitions are then stored for later use. The system can conduct competitions from those that have been stored or broadcast, or from those that can be created by individual teachers. Previously broadcast and stored competitions can be played simultaneously by a plurality of remote locations, in a "live competition" setting.

An electronic classroom teaching aid also should assist a teacher in breaking through the reluctance that students have to asking questions in class. Some of this reluctance derives from basic shyness, or fear of seeming different, or fear of seeming more or less intelligent. Enabling students to ask questions individually about the material presented and confidentially by electronic means presented by the teacher can help to break through some of the shyness or reluctance a student otherwise may exhibit.

In larger classes, it may also allow teachers to gather and address questions that might otherwise go unanswered. For example, it may often be convenient for students to enter questions they have to be put in a queue to be answered by the teacher. One problem with this method, however, involves the current cumbersome methods for students to enter questions in networked, handheld devices in an efficient manner. For example, it is difficult to type questions or enter them using a stylus, because using a keyboard or stylus to enter questions is slow, prone to error, and distracting. This may limit the ability of the networked, handheld devices to improve the learning environment.

There is therefore a need for an improved technique for entering questions about presented material using networked, handheld devices in an efficient manner.

DISCLOSURE OF THE INVENTION

A system, method and computer program product are disclosed for providing feedback using networked devices. Initially, a plurality of response types are displayed on a plurality of networked devices. Further, a plurality of presented concepts are depicted on the networked devices. As such, users of a group are permitted to select at least one of the response types and at least one of the presented concepts. Further, the selected response type and the presented concepts are transmitted to a head of the group for providing feedback regarding material being presented by the head of the group.

In one embodiment of the present invention, the networked devices may include thin client devices. Further, such thin client devices may include wireless devices. Still yet, the wireless devices may include hand-held wireless devices such as personal digital assistants (PDAs) each including a stylus.

In another embodiment of the present invention, the response types may include question types. Further, each question type may include a variable representing a presented concept. Still yet, the response types may include statements of belief or attitude.

As an option, the presented concepts may be extracted from the material being presented. Such presented concepts may be extracted from the material being presented utilizing voice recognition, or a filtering technique. Further, the presented concepts may be predetermined by the head of the group.

Still yet, a priority level may be assigned to at least one of the response types and the presented concepts. Optionally, the priority level may be selected by the users. This priority level may be transmitted to the head of the group.

In still another embodiment, the selections of the users may be filtered for facilitating a response by the head of the group. Also, responses may automatically be generated to the transmitted response type and presented concepts.

BRIEF DESCRIPTION OF THE DRAWINGS

FIGS. 6A and 6B illustrate one exemplary flow diagram and display, in accordance with one embodiment of the present invention.

DESCRIPTION OF THE PREFERRED EMBODIMENTS

Figure 1:
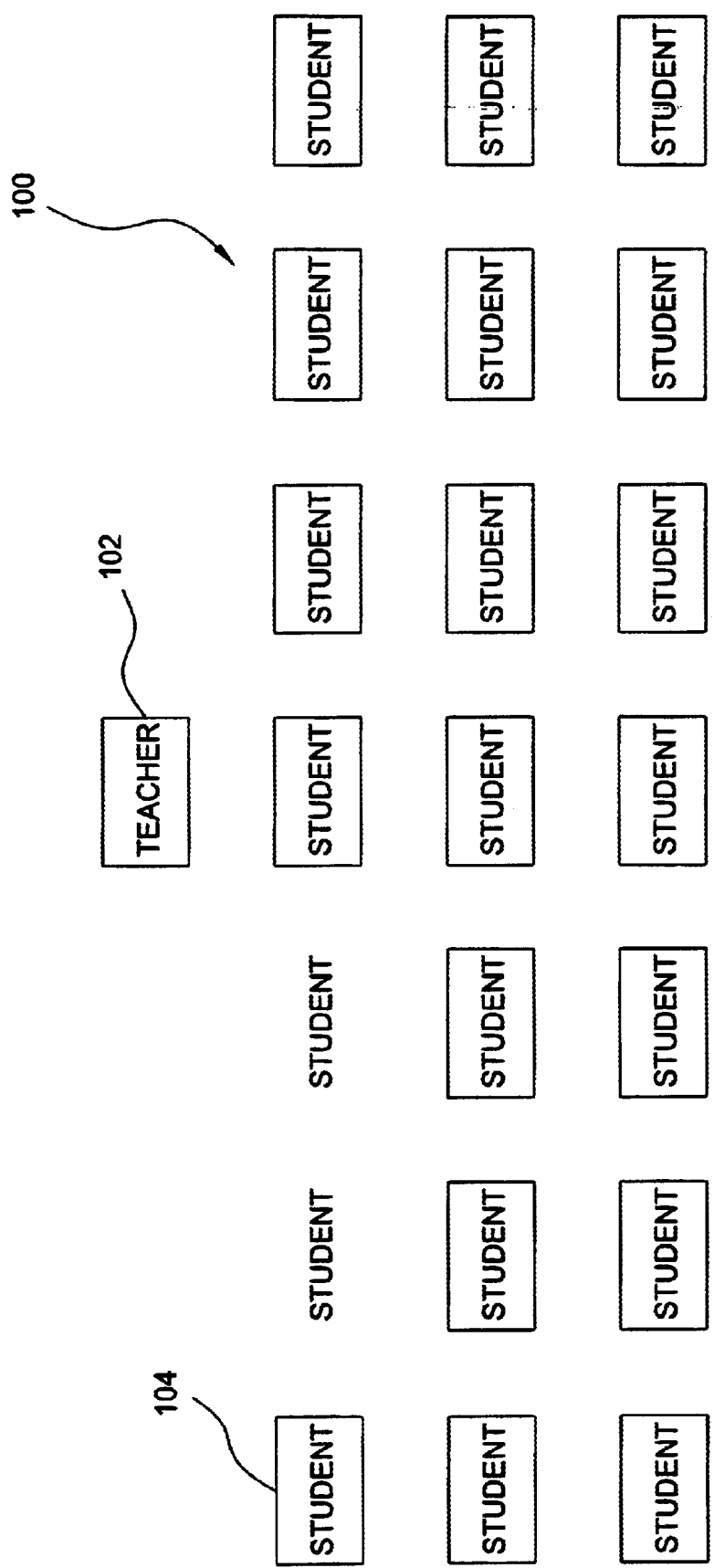
FIG. 1 illustrates one exemplary environment in which the present invention may be implemented.

FIG. 1 illustrates one exemplary environment in which the present invention may be implemented. As shown, an educational environment 100 may be provided with a plurality of students 104 and a teacher 102. It should be noted that any type of environment may be used where a plurality of users are formed in a group which is instructed, addressed, etc. by a head of the group. It should also be understood that the group of students 104 need not necessarily be congregated in a single location.

One exemplary embodiment involves the following system components:

- networked thin client devices, one for each group participant
- a computer or networked thin client device for the group leader
- a programming language that operates on the client devices
- a peer-to-peer directional communication capability between client devices
- a networked server computer
- a programming language that operates on the server
- a networking protocol through which the clients and server can send messages to each other, and optionally among clients
- a data description language in which the clients and server read and write messages for each other, and optionally among clients
- a display visible by the group leader and participants Descriptions for preferred and alternative embodiments are set forth for each component below; the overall assemblage can be realized in many different combinations without undue difficulty. In particular, alternative embodiments may utilize mixed kinds of devices, mixed kinds of program languages, mixed networking protocols, and mixed data description languages.

Figure 2:
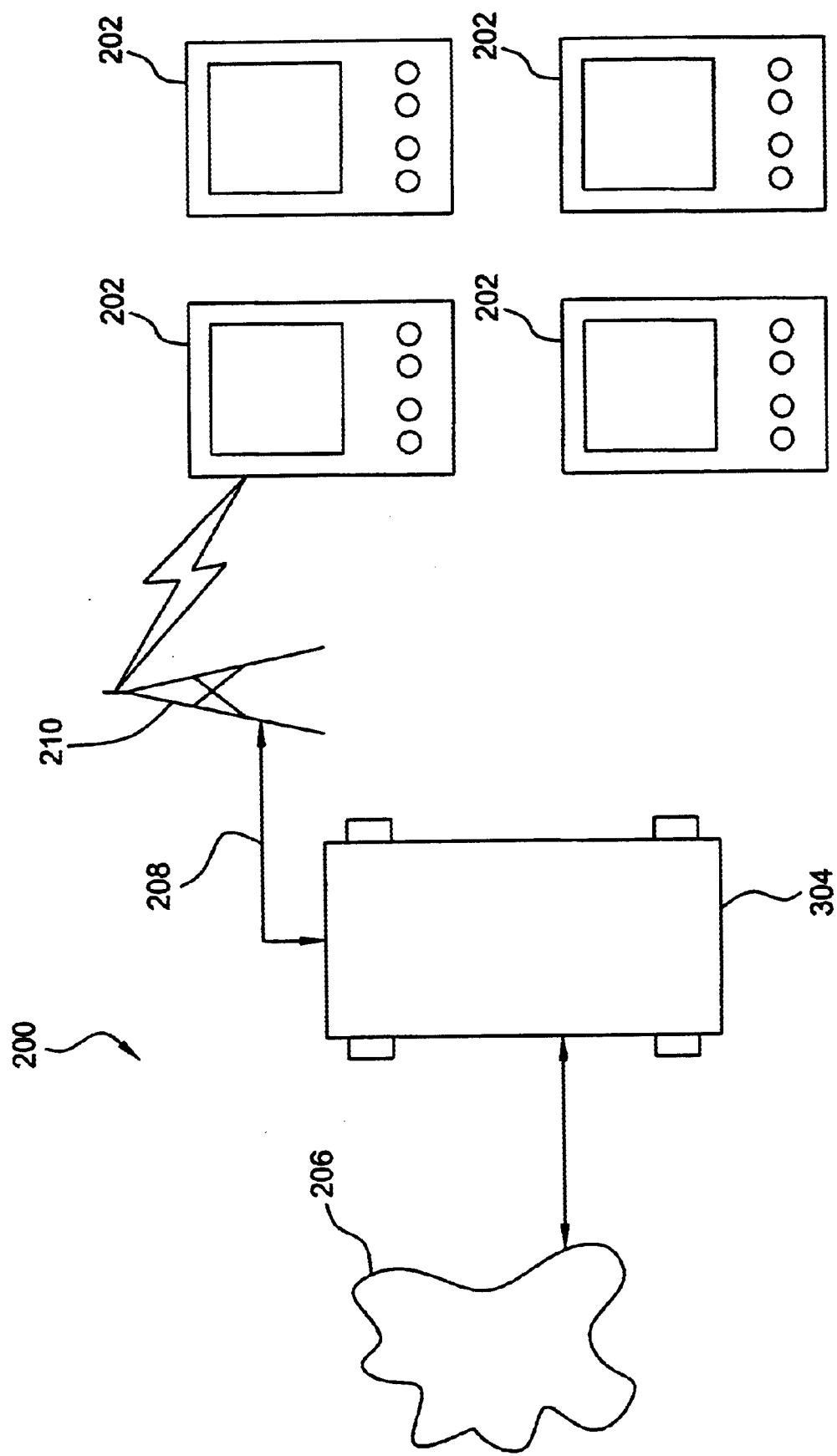
FIG. 2 depicts an exemplary operating environment including one or more thin client devices in connection with a host computer system.

FIG. 2 depicts an exemplary operating environment 200 including one or more thin client devices 202 in connection with a host computer system 204. In one embodiment, each of the students 104 may be equipped with one of the thin client devices 202, and the teacher 102 may be capable of using the host computer system 204. As an option, the teacher 102 may also interface with the host computer system 204 utilizing one of the thin client devices 202. The host computer system 204 may optionally be connected to remote sources of data information on the Internet 206. As an option, the thin client devices 202 may be wireless devices. In such embodiment, the host computer system 204 may include a peripheral interface adapter that provides for the bi-directional transfer of the data via an interconnect line 208 to a transceiver 210 that supports wireless communications with one or more wireless devices.

Figure 3:
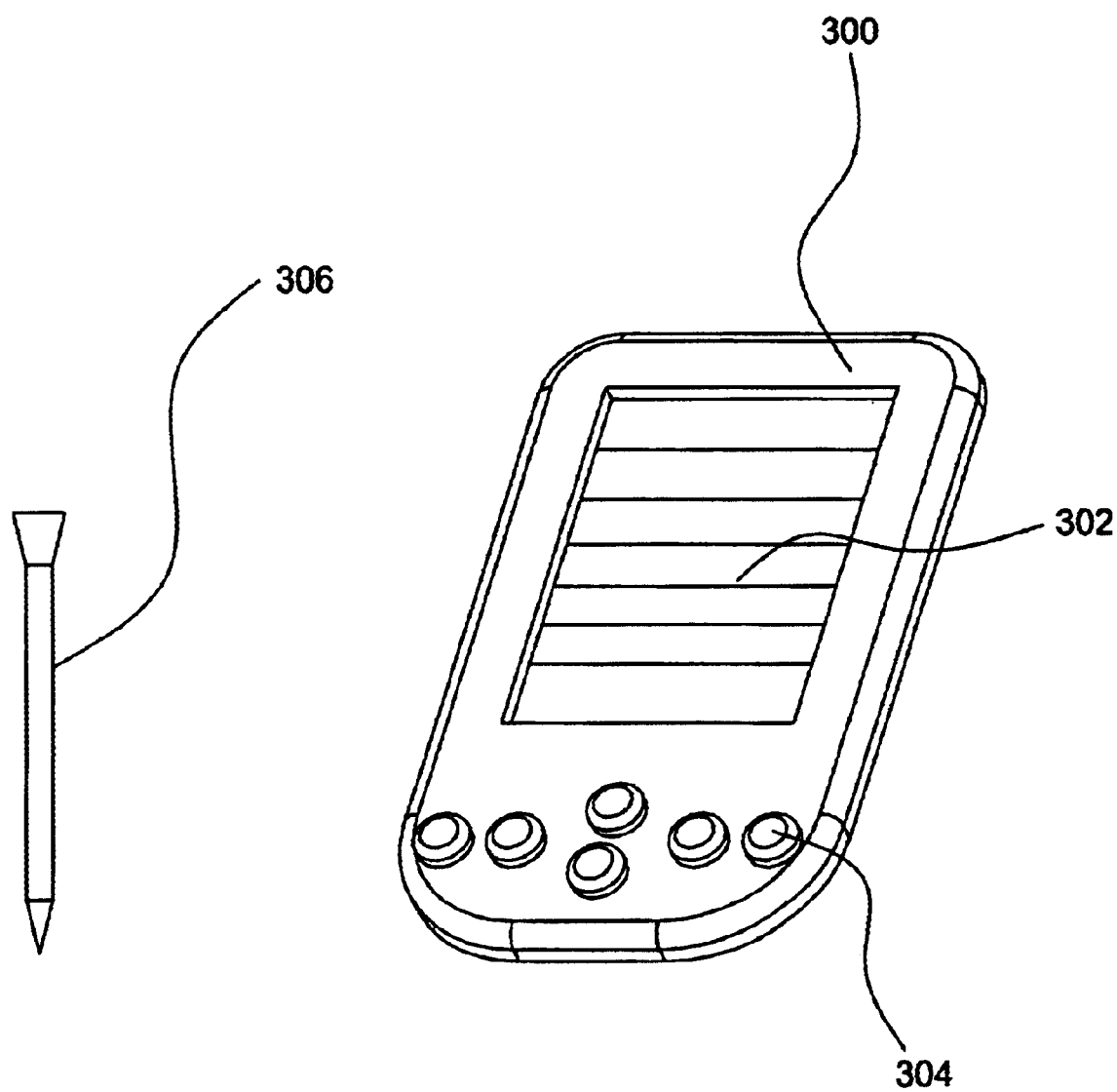
FIG. 3 illustrates an exemplary wireless thin client device.

In one embodiment, each networked thin client device is a handheld, palm-sized computer. FIG. 3 illustrates an exemplary wireless thin client device 300. Such wireless device 300 is preferably constructed with a plastic case housing a display panel 302, a keypad 304, and a stylus 306.

In the present description, use of the term "networked thin client device" is meant to include a wide variety of personal computing devices with any one or more of various features. For example, such networked devices may have: (a) a means of graphic and textual output (b) a means of pixel-oriented spatial input and textual input and/or (c) a means of networking with other like devices and with a server. Optionally they devices may have a means of peer-to-peer communication with a single, appropriately equipped partner device. Embodiments could include but are not limited to: personal digital assistants, handheld gaming toys, cell phones, graphing calculators, tablet-based computers, and personal computers.

One preferred embodiment is battery powered; alternative embodiments can use any appropriate power source. One preferred device has a plastic or metal case; alternative embodiments can use any casing material appropriate for devices that will be handled by participants. One preferred device provides conveniences such as a cover for protecting the display and a contrast control; alternative embodiments might not have such conveniences, or many more conveniences might be provided. A variety of software can be run on one preferred devices, including address, datebook, to-do list and notebook applications, although none of these software applications are strictly required, and many more such applications could be used in conjunction with an alternative embodiment.

In one preferred embodiment the graphic and textual output is accomplished by means of a 160×160 pixel Liquid Crystal Display (LCD) screen, capable of displaying four levels of gray. In alternative embodiments, the screen may be larger or smaller, may be black and white only, or may display more levels of gray, or may display color. This screen may or may not have a backlight. In another alternative embodiment the screen could utilize a cathode ray tube (CRT) monitor. In another alternative embodiment the screen could consist of paper with ink droplets which can be caused to display or hide digitally, in a pixel array. As additional novel display technologies arise, little effort is foreseen to embody the invention, provided that the display is controllable by software in a manner similar to the control of today's pixel displays.

In one preferred embodiment, spatial and textual input is accomplished by use of a stylus, to write upon the stylus-sensitive LCD screen. The physical contact is recognized by operation system software on the client, and made available to client programming languages as logical input, such as entering text, drawing a line, or selecting a location on the screen. Optionally, buttons on the device can be used to indicate input. In the present embodiment, buttons are used for selecting a client application, and to indicate operations within the client program. Optionally, a keyboard may be attached to the device and used to produce input. In one alternative embodiment, input might be accomplished via audio input; voice recognition software could translate voice input into commands. In another alternative embodiment, spatial input may be accomplished via a physical pointing device such as a mouse, trackball, or joystick. In another alternative embodiment, one or more buttons might be used to indicate spatial positioning. In another alternative embodiment, eye gaze recognition might be used to accomplish spatial input. As additional novel input devices arise, little effort is foreseen to embody the invention, provided that the input is made available to client software in a similar manner as stylus, keyboard, or pointing input is made available to today's client software.

One preferred embodiment incorporates an infrared (IR) emitter and sensor, which enables the exchange of messages or data with a peer device (popularly called "beaming"). The peer device may be of a similar make and model as the first device, or may be another make or model of device supporting a similar IR emitter and sensor and a compatible communications protocol. In alternative embodiments, other methods of directional communication may be used, or beaming may not be supported by the device.

One preferred embodied also uses a networked thin client as the computer for the group leader. This networked thin client has the same characteristics listed above. In alternative embodiments, a desktop or laptop computer could be used for the group leader. In alternative embodiments, the server computer might be used directly by the group leader. In alternative embodiments, an infrared or radio frequency remote control might be used by the group leader to control the server. In alternative embodiments the teacher might control the server computer through voice commands. In alternative embodiments, the teacher might control the server computer by actions on a large flat markable display, such as a whiteboard, which has been instrumented so as to send commands to the server.

In one preferred embodiment, the ANSI C programming language is used to create client software on the thin client device, utilizing the operating system provided by the manufacturer on the device. The invention, however, does not require any features specific to ANSI C, and many other programming languages could be used. Object oriented programming is a popular technique. An alternative implementation could use an object-oriented language, such as C+ or the JAVA object-oriented language. Alternative embodiments could also use interpreted languages, such as Basic, or the JAVASCRIPT interpretive language. On some devices, there is no support for languages other than assembly language (some models of Texas Instruments' graphing calculators are examples); alternative embodiments could be written in assembly language or machine code.

In one preferred embodiment, the textual program is compiled producing object code, the object code is transferred to the client, and the client code may then be executed. In an alternative embodiment, the textual program may be compiled to a machine-independent format, such as JAVA byte code. The machine-independent code may then be transferred to the client, and the client code may be executed using a special program that interprets byte code and produces the desired effects (such an interpreter is conventionally called a "virtual machines"). In alternative embodiments, the textual program may be transferred to the client without prior compilation, and executed via a program called an interpreter. An interpreter reads the program directly and produces the desired effect. Basic is an example of an interpreted language.

Alternative embodiments have been described using a variety of programming languages and means of executing programs written in those languages. Although programming languages differ in the means they afford for expression, and the means they offer for execution, different programming languages can be used to the produce the equivalent input/output and information processing behaviors. No particular difficulties are foreseen in deploying the invention in alternative embodiments using any programming language that can execute on the client device and produce equivalent input and output, and perform the requisite information processing steps.

Figure 4:
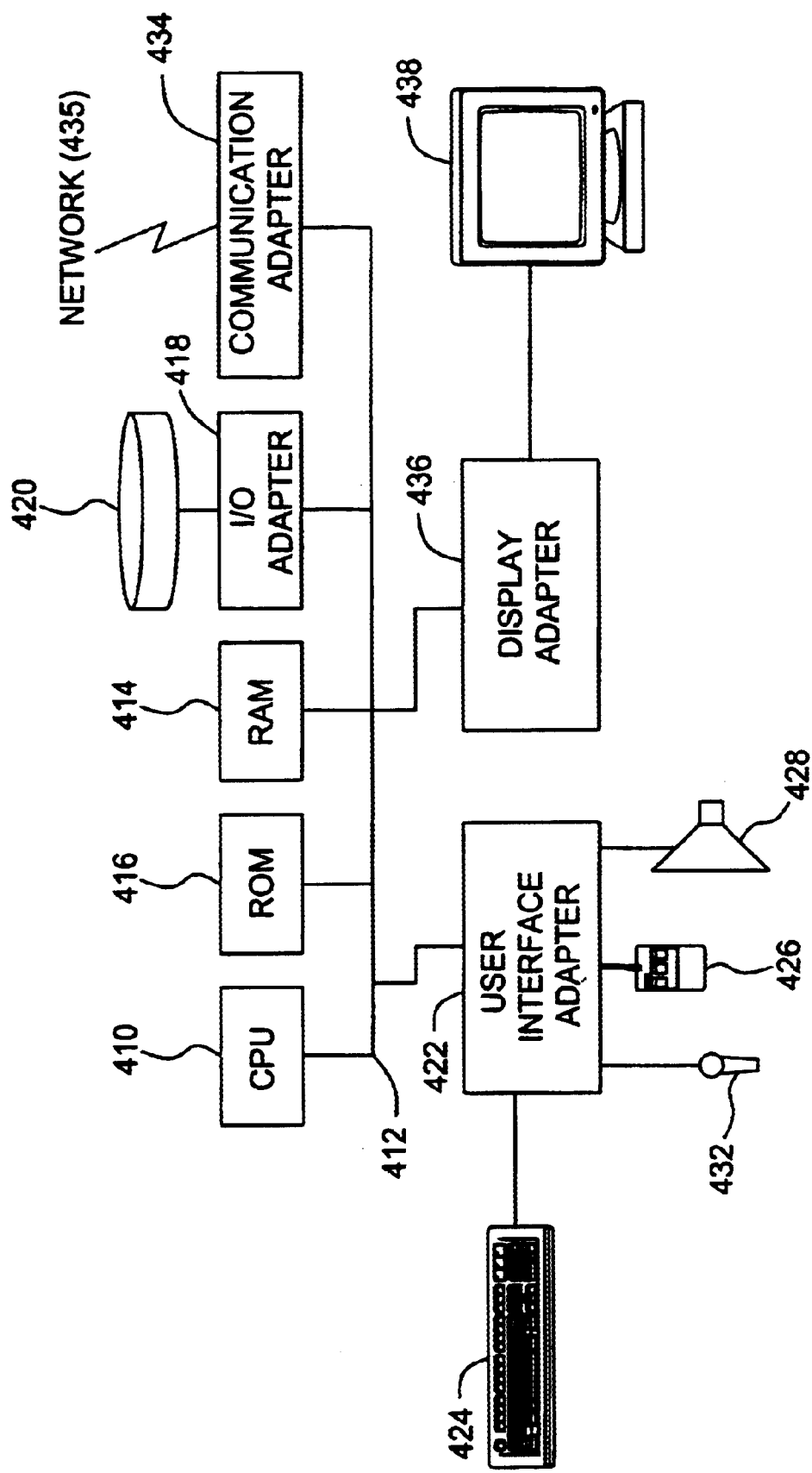
FIG. 4 shows a representative hardware environment associated with the host computer system of FIG. 2.

FIG. 4 shows a representative hardware environment associated with the host computer system of FIG. 2. Such figure illustrates a typical hardware configuration of a workstation in accordance with a preferred embodiment having a central processing unit 410, such as a microprocessor, and a number of other units interconnected via a system bus 412.

The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the workstation to a communication network 435 (e.g., a data processing network) and a display adapter 436 for connecting the bus 412 to a display device 438.

In one preferred embodiment, the server computer is a stock POWER MACINTOSH G4 computer, available from Apple Computer Corp., Cupertino Calif., with an 802.11b networking card installed. This server computer has a central processing unit, random access memory (RAM), read only memory (ROM), disk storage, Ethernet networking hardware and connectors, and capabilities for attaching input and output devices, principally a keyboard, mouse, and CRT monitor. The POWER MACINTOSH G4 computer also has an antenna, card, and software support wireless networking via the IEEE 802.11b standard. The server computer has operating system software capable of executing server programs, which can intercommunicate with clients and other servers, and can access RAM, ROM, and disk storage. Alternative embodiments could use other computer hardware. A wide variety of processing chips might be used, including PENTIUM processing chips, SPARC processing chips, ARM processing chips, CRUSOE processing chips, or other processing chips. More than one processing chip might be used in the same server. A wide variety of storage devices might be used. In alternative embodiments storage might reside on devices outside the main computer box, connected by dedicated wiring, or by general purpose networking. In alternative servers, other physical networking layers might be supported, as will be discussed below. In alternative embodiments other operating systems might be used, such as Linux, the SOLARIS operating system, the WINDOWS95 operating system, the WINDOWS98 operating system, the WINDOWS NT operating system, or the WINDOWS 2000 operating system. In alternative embodiments, a coordinated collection of computers might collectively act as the server. In alternative embodiments, the server might be a network appliance, with no provision for input and output devices, other than a connection to a network. In alternative embodiments, the server might also reside on a client device, with one client acting as server, or acting as both client and server. As described immediately below, there are many alternative networking embodiments. An alternative server embodiment may not have an Ethernet card and connector, but would only have the networking hardware and connectors used for its specific networking option. Likewise, if 802.11b is not the networking embodiment used, the server might not have an 802.11b card and antenna.

On preferred embodiment uses Java as the programming language on the server. In particular, the Servlet Application Programmer Interface (API) is used to write server programs. Textual server programs are compiled into Java byte code. A virtual machine executes this byte code. One preferred embodiment utilizes a JAVA web server program within which the program executes. In alternative embodiments the JAVA program could be executed in conjunction with other web server programs, such as Apache, NETSCAPE, or MICROSOFT web servers. The discussion of alternative program languages presented with regard to the client program also pertains to the server programming. A wide variety of program languages and means of executing programs offer equivalent capabilities. Alternative embodiments could thus be constructed many different programming languages and execution facilities. A list of possible languages, which is by no means exclusive, includes C, C++, PYTHON, PERL, ACTIVE SERVER PAGES, JAVA SERVER PAGES, JAVASCRIPT, and Basic programming languages.

Networking is generally conceived of in terms of layers; although 7 or more layers are commonly used, the present discussion will be simplified to three layers: physical, transport, and application.

One preferred embodiment uses a combination of infrared (IR) beaming and Ethernet cabling as physical layer. Alternative embodiments of the physical layer could use radio frequency (RF) communication in the 900 megahertz, 2.4

Gigahertz, or other spectrums, as an alternative to IR. Alternative embodiments could also use wired connections to a partner device (such as a cell phone) which is then connected to the network. It is the nature of internet protocols to allow many combinations of physical topology and infrastructure to interoperate, and thus endless combinatorics prevent us from listing all possible alternative embodiments of the physical layer. At any rate, any physical layer will suffice as long as it connects the devices and allows a suitable network protocol to be used to exchange information among them.

One preferred embodiment uses TCP/IP for the middle transport layers. For IR communication Point to Point Protocol (PPP) is used or irDA to make a TCP/IP connection to a wired Ethernet switch, which then provides TCP/IP connectivity to the rest of the wired network. One preferred embodiment runs TCP/IP over PPP over irDA. Alternative embodiments could use TCP/IP over BLUETOOTH, 802.11, or HomeRF standards. An alternative embodiment could substitute AppleTalk, a newer version of TCP/IP or another transport protocol for the present use of TCP/IP. Transports are generally equivalent, for the purposes. herein, provided they can deliver messages between the two addressable devices in a timely and reasonably dependable fashion, and those messages can support an application protocol such as HTTP and data such as XML.

Sockets are used at the application layer, using a custom protocol for communication. This protocol is a simplified version of the HyperText Transport Protocol (http), and allows for requesting information from the server via GET operations and sending information to the server via POST operations. A secondary socket channel is also used to send change notification messages from server to client. The protocol for this channel consists of POSTing a "changed" message with optional timestamp information, as well as an optional indication as to what changed. An alternative embodiment could use the Object Exchange protocol (OBEX). Another alternative embodiment could use HTTP 1.0 or greater; many programming languages contain libraries or classes that directly support these protocols without direct reference to sockets. Little difficulty is foreseen in using alternative logical representations of a communications channel between devices, so long as it provides read and write operations that receive and send structured textual and/or binary data between addressable devices, along the lines of the http get and post messages.

One preferred embodiment uses a simplified form of the extensible markup language (XML) for structuring the data messages which are exchanged among clients and the server. An alternative embodiment could use HTML. An alternative embodiment could use a binary message format that contains equivalent information. An alternative embodiment could use XML without simplification. An alternative embodiment could use another structured text description language, so long as matching encoders and decoders can be written for both sides of the communication channel.

One preferred embodiment includes a public display, visible by the group leader and group participants. A computer projector is used to cast this image upon a reflective, flat surface at the front of the room. In alternative embodiments, a wide variety of projection technologies could be used. The projection could be from in front of or behind the screen. The projection unit might contain a light source, or rely upon an external light source. In alternative embodiments, the large public display might be large CRT monitor or LCD display. In alternative embodiments, participants may not be in the same room, and the "public" display may be a display area reserved for this purpose on their remote computer or device. In general, any device may serve as the public display as long as (1) it can display computer graphics images (2) the computer graphics images can be controlled by a computer, such as the server or the group leader's computer, (3) all participants can see it when required by the group activity to do so.

Figure 5:
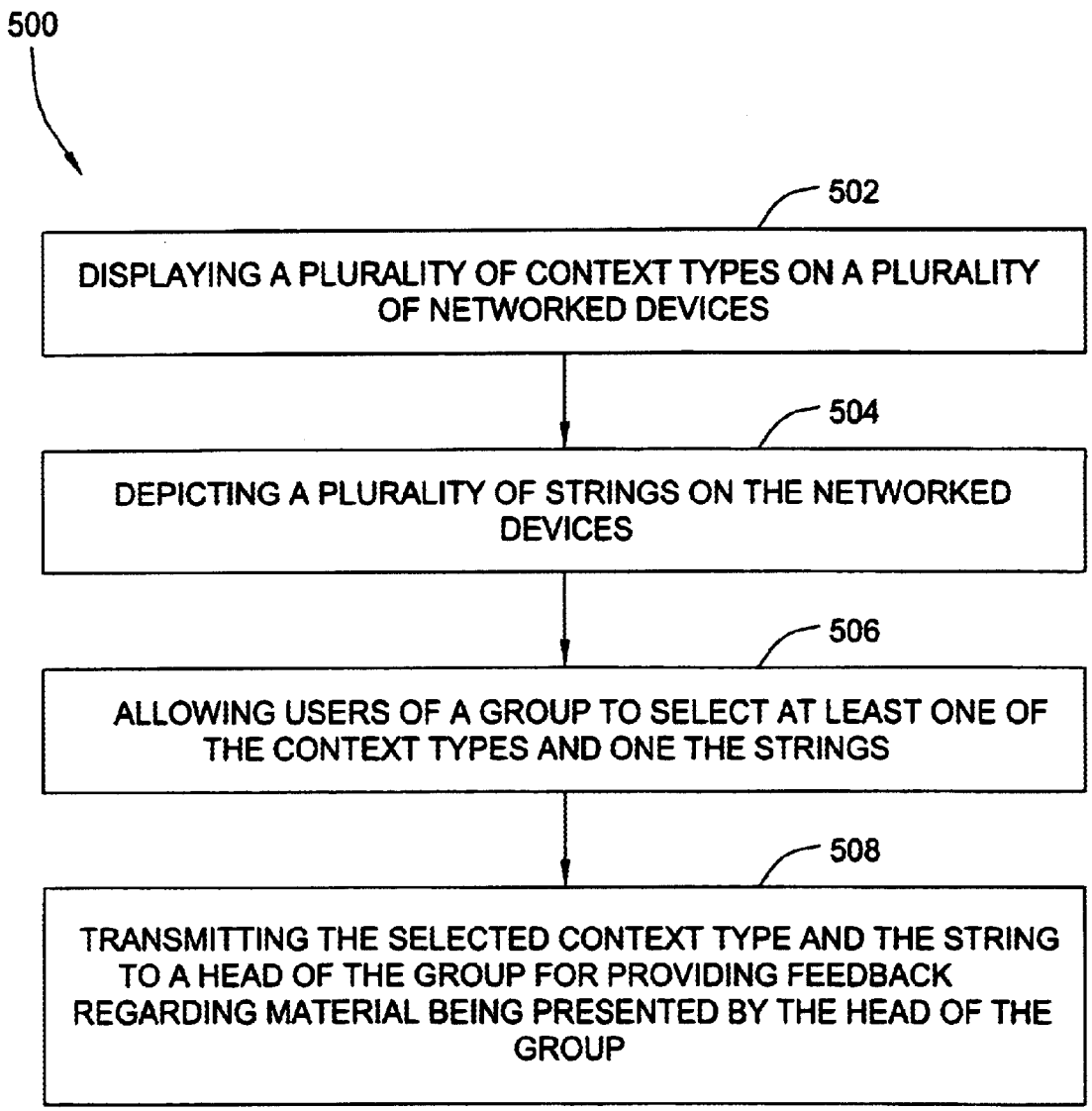
FIG. 5 illustrates a method for providing feedback using networked devices.

FIG. 5 illustrates a method 500 for providing feedback using networked devices. In one embodiment of the present invention, the networked devices may include thin client devices. Further, such thin client devices may include wireless devices. Still yet, the wireless devices may include hand-held wireless devices such as personal digital assistants (PDAs) each including a stylus, as set forth hereinabove during reference to FIGS. 2 and 3. It should be noted, however, that any type of networked devices may be employed per the desires of the user.

Initially, in operations 502 and 504, a plurality of response types are displayed on a plurality of networked devices along with a plurality of presented concepts, respectively. As an option, the response types may include question types each having a variable representing at least one of the presented concepts. The presented concepts may correspond with material being presented to users of the networked devices. It should be noted, however, that the response types may include any type of response, while the presented concepts may represent any alphanumeric characters, i.e. words, mathematical equations, etc., that are relevant to the material being presented. Additional information regarding the display of the response types and presented concepts will be set forth during reference to FIGS. 6A and 6B.

As an option, the presented concepts may be extracted from the material being presented. This may be accomplished utilizing voice recognition of what a person has recently been saying. Further, words that are repeatedly used in a presentation using a presentation application, word processor, or PDF-based program may be detected, and included as presented concepts. Moreover, presented concepts may be extracted from the material being presented using an index of terms in a textbook associated with the material being presented, and/or filtered by the particular relevant chapter of the textbook. As a further option, the presented concepts may be predetermined explicitly by, for example, the head of the group.

Thereafter, in operation 506, users of the group are allowed to select at least one of the response types and at least one of the presented concepts. For example, users may utilize a stylus to simply touch a displayed word or response type for selecting the same. It should be noted, however, that selection may be accomplished in any desired convenient manner.

The selected response type and the presented concepts are then transmitted to a head of the group for providing feedback regarding material being presented. Note operation 508. The selections may be transmitted to any device operated by the head of the group, i.e. a host computer, hand held device, etc. Further, the selections may be transmitted via a wireless or hard line communication medium. In one embodiment, the users may be students and the head of the group may be a teacher.

In one embodiment of the present invention, a priority level may be assigned to at least one of the response types and the presented concepts. As an option, the priority level may be selected by the users. Further, such priority level may then be transmitted to the head of the group to facilitate a response to the feedback.

In another embodiment of the present invention, the selections of the students may be filtered for facilitating a response by the teacher. For example, an indication may be given to the teacher as to which presented concepts have been selected the most. Further, the response types and/or presented concepts may be prioritized based on the relevancy of selection. Moreover, the response types and/or presented concepts may be prioritized based on the explicit selection of the students.

Further, responses may be automatically generated to the transmitted response type and presented concepts. Such responses may be selected from a database of stock answers including definitions, equations, or the like that may be easily presented to the user for a quick response to the feedback.

One example of use of the present invention will now be set forth. It is important to note that the present example is merely for illustration purposes, and should not be construed as limiting in any manner. The general principles of the present invention may be applied in any desired manner to accomplish varying objectives.

FIG. 6A illustrates a flow diagram showing the various functionality associated with the present invention, in accordance with one embodiment. As shown, presented concepts, i.e. keywords, are collected from material being presented and other sources such as a textbook or the like. Note operation 602. Such present concepts are then collected in memory, i.e. RAM, for the purpose of being distributed to the group members via the networked devices. Note operation 604.

Such collection and distribution process may be manual or automatic. Further, it may be carried out at any desired predetermined frequency, randomly, or based on the flow of the presentation by the group leader. For example, such process may be executed upon the group leader displaying new screens of material on a display.

Figure 6B:
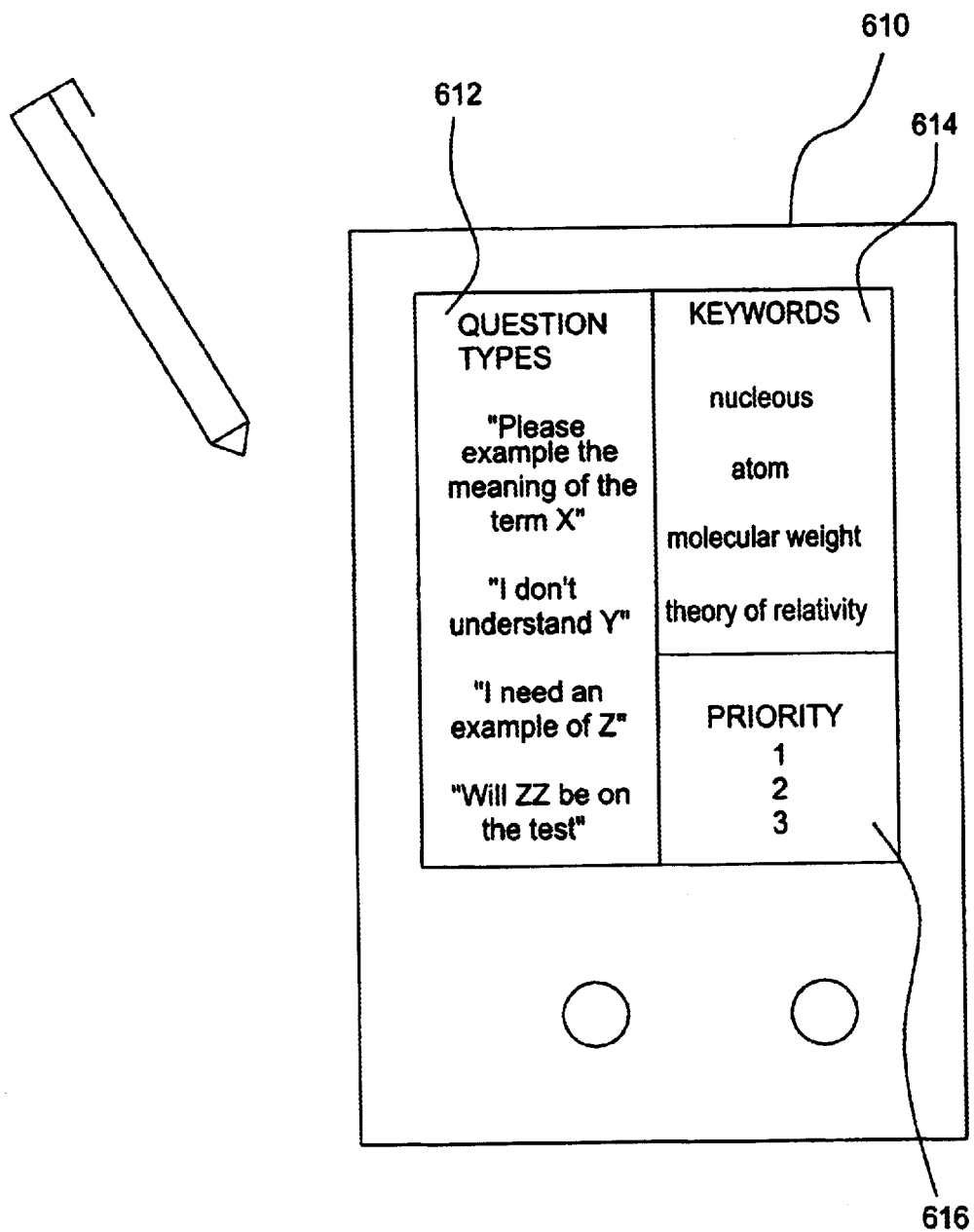

Next, group members may provide feedback in a manner that will be set forth in greater detail during reference to FIG. 6B. Note operation 606. Such feedback is then stored in a message cue. To this end, the group leader may monitor and manually respond to feedback via a display in operation 608, and/or the feedback may be handled by an auto-response agent for providing instant, automatic responses. See operation 609.

FIG. 6B illustrates an exemplary display 610 depicted on the network devices during the present example of use. Note operation 606 in FIG. 6A. In the current embodiment, the display 610 may show two columns indicating the response types 612 and the presented concepts 614, respectively. Such column of response types 612 may include question types, or stems, such as "Please explain the meaning of the term X," "I don't understand Y," "I need an example of Z." "Will ZZ be on the test?," and/or any other desired stem. Various choices of priority levels 616 may also be displayed for selection purposes. As mentioned earlier, the priority levels 616 are optional, and the response types may include any statement of belief or attitude, or any type of response for that matter.

By selecting a question stem and a keyword representative of presented concepts (and optionally a priority rating) and pressing send, a student can very quickly post a question. Overall, the present invention makes it much easier and quicker for students to formulate good questions. Because questions come from a known set of stems and keywords, it is easier to automatically filter questions or return appropriate responses.

As such, a teacher can use filters for questions based on the stems and/or keywords and/or priority. For example, the teacher might wish to interrupt lecture for requests to define a term, but might wish to defer requests for additional examples until after class. Teachers might have auto-responders for particular types of questions (e.g. a request for a definition of a term might grab the definition from the textbook and immediately give it to the student via the networked device).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing feedback using networked devices, comprising the steps of:
   (a) displaying a plurality of response types on a plurality of networked devices, wherein the response types include question types;
   (b) depicting a plurality of presented concepts on the networked devices, wherein each question type includes a variable representing one of said presented concepts;
   (c) allowing users of a group to select at least one of the response types and at least one of the presented concepts; and
   (d) transmitting the selected response type and the presented concepts to a head of the group for providing feedback regarding material being presented by the head of the group.

2. The method as recited in claim 1, wherein the networked devices include thin client devices.

3. The method as recited in claim 2, wherein the thin client devices include wireless devices.

4. The method as recited in claim 3, wherein the wireless devices include hand-held wireless devices.

5. The method as recited in claim 1, wherein the response types include statements of belief or attitude.

6. The method as recited in claim 1, wherein the presented concepts are extracted from the material being presented.

7. The method as recited in claim 6, wherein the presented concepts are extracted from the material being presented utilizing voice recognition.

8. The method as recited in claim 6, wherein the presented concepts are extracted from the material being presented utilizing a filtering technique.

9. The method as recited in claim 1, wherein the presented concepts are predetermined by the head of the group.

10. The method as recited in claim 1, and further comprising the step of assigning a priority level to at least one of the response types and the presented concepts.

11. The method as recited in claim 10, wherein the priority level is transmitted to the head of the group.

12. The method as recited in claim 10, wherein the priority level is selected by the users.

13. The method as recited in claim 1, wherein the users are students and the head of the group is a teacher.

14. The method as recited in claim 1, and further comprising the step of filtering the selections of the users for facilitating a response by the head of the group.

15. The method as recited in claim 1, and further comprising the step of automatically generating responses to the transmitted response type and presented concepts.

16. The method as recited in claim 1, wherein the transmitting is carried out by a server.

17. A computer program product encoded on a computer-readable medium for providing feedback using networked devices, comprising:

(a) computer code for a plurality of response types on a plurality of networked devices, wherein the response types include question types;
(b) computer code for depicting a plurality of presented concepts on the networked devices, wherein each question type includes a variable representing one of said presented concepts;
(c) computer code for allowing users of a group to select at least one of the response types and at least one of the presented concepts; and
(d) computer code for transmitting the selected response type and the presented concepts to a head of the group for providing feedback regarding material being presented by the head of the group.

18. A system for providing feedback using networked devices, comprising:

(a) logic for a plurality of response types on a plurality of networked devices, wherein the response types include question types;
(b) logic for depicting a plurality of presented concepts on the networked devices, wherein each question type includes a variable representing one of said presented concepts;
(c) logic for allowing users of a group to select at least one of the response types and at least one of the presented concepts; and
(d) logic for transmitting the selected response type and the presented concepts to a head of the group for providing feedback regarding material being presented by the head of the group.

\* \* \* \* \*